(12) United States Patent
Townson et al.

(10) Patent No.: US 9,377,044 B2
(45) Date of Patent: Jun. 28, 2016

(54) ADJUSTABLE TUNING PIN ASSEMBLY

(75) Inventors: James M. Townson, Clarkston, MI (US); Mark L. Felzien, Rochester Hills, MI (US); Spinivasa A. Mandadapu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1166 days.

(21) Appl. No.: 13/400,300

(22) Filed: Feb. 20, 2012

(65) Prior Publication Data

US 2013/0212863 A1 Aug. 22, 2013

(51) Int. Cl.
| | | |
|---|---|---|
| F16D 1/00 | (2006.01) |
| F16B 19/02 | (2006.01) |
| F16B 17/00 | (2006.01) |
| F16B 4/00 | (2006.01) |
| F16B 5/08 | (2006.01) |

(52) U.S. Cl.
CPC ............... F16B 19/02 (2013.01); F16B 17/006 (2013.01); *F16B 4/004* (2013.01); *F16B 5/08* (2013.01); *Y10T 29/49947* (2015.01); *Y10T 403/75* (2015.01)

(58) Field of Classification Search
CPC ......... Y10T 403/75; F16B 4/004; F16B 5/08; F16B 17/006; F16B 19/02; B62D 27/02; B62D 27/06
USPC ................ 403/1, 13, 27, 359.1–359.6, 408.1, 403/409.1; 411/398; 280/86.753
See application file for complete search history.

(56) References Cited

U.S. PATENT DOCUMENTS

| | | | | |
|---|---|---|---|---|
| 3,034,611 | A * | 5/1962 | Zenzic ...................... 403/408.1 |
| 3,556,570 | A * | 1/1971 | Cosenza ...................... 411/176 |
| 5,503,494 | A * | 4/1996 | Kamata et al. ............. 403/359.6 |
| 6,224,309 | B1 * | 5/2001 | Yamamoto ...................... 411/11 |
| 6,261,042 | B1 * | 7/2001 | Pratt .............................. 411/551 |
| 6,712,544 | B2 * | 3/2004 | Kruger et al. .............. 403/408.1 |
| 6,719,482 | B2 * | 4/2004 | Morita ........................ 403/408.1 |
| 6,802,848 | B2 * | 10/2004 | Anderson et al. ............. 606/157 |
| 6,979,144 | B2 * | 12/2005 | Iwasaki ....................... 403/359.6 |
| 7,413,367 | B2 * | 8/2008 | Hawang ........................ 403/297 |
| 2009/0136294 | A1 * | 5/2009 | Porter et al. ................ 403/408.1 |
| 2010/0119301 | A1 * | 5/2010 | Langer et al. .............. 403/359.5 |

FOREIGN PATENT DOCUMENTS

| | | |
|---|---|---|
| CA | 2763103 A1 | 10/2010 |
| CN | 1877142 A | 12/2006 |

* cited by examiner

*Primary Examiner* — Gregory Binda
*Assistant Examiner* — Nahid Amiri

(57) ABSTRACT

A tuning pin assembly for mounting a first structural component to a second structural component. A locating pin is fixed to the first component and has a shaft with an outer surface that is concentric about a pin axis. An eccentric cap has a radially inner pin engagement surface that is mounted on the outer surface and is concentric about the pin axis, a radially outer alignment surface that is eccentric about the pin axis and slides into an alignment hole in the second component to align the second component relative to the first component. A first rotation resistance feature is located on at least one of the outer surface of the locating pin and the pin engagement surface of the eccentric cap engaging between the outer surface and the pin engagement surface to resist torque applied to the eccentric cap to rotate the cap.

18 Claims, 3 Drawing Sheets

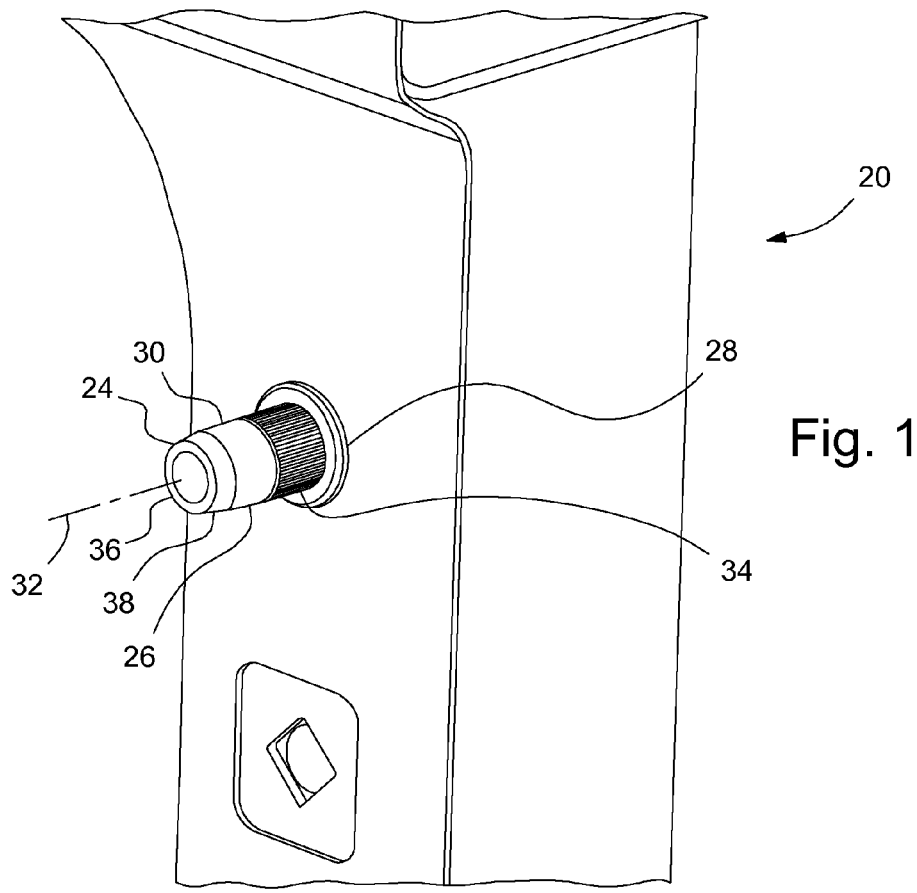
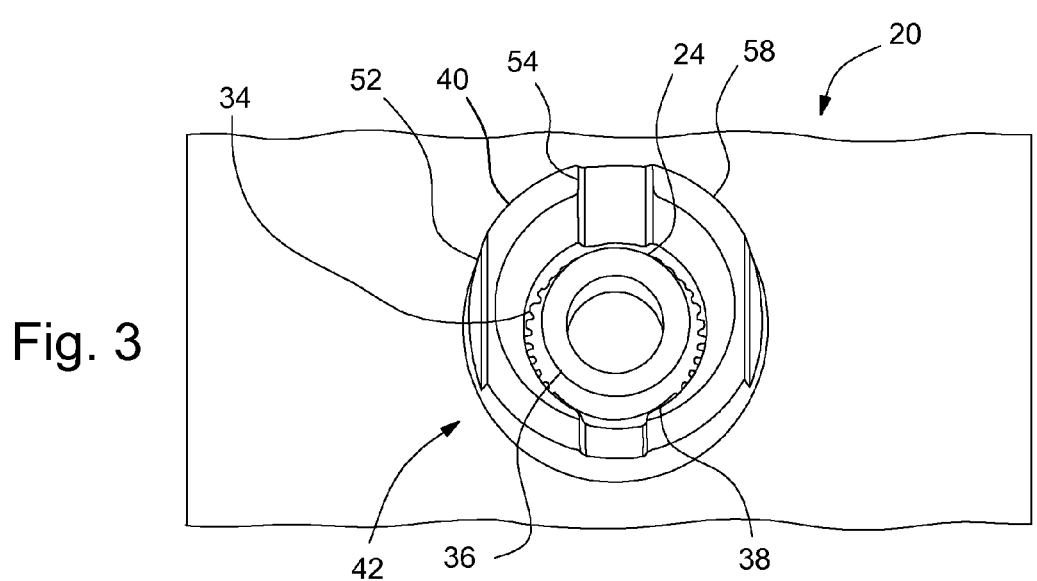

ADJUSTABLE TUNING PIN ASSEMBLY

BACKGROUND OF INVENTION

The present invention relates generally to locating pins used to align one structural component relative to another.

For some types of assembly operations, locating pins are used to locate a first structural part relative to a second structural part before the two are permanently secured together. However, due to tolerances between parts, there can be variation in how the surfaces of the two parts align. This may be the case, for example, with some vehicle structural components where two components are aligned with locating pins prior to being secured together by welding. The tolerances between the components may mean that the location of the two components relative to each other does not meet desired gap and flushness requirements needed to satisfy the esthetic requirements for the vehicle.

SUMMARY OF INVENTION

An embodiment contemplates an eccentric tuning pin assembly for mounting a first structural component to a second structural component. A locating pin is fixed to the first structural component and has a shaft with an outer surface that is concentric about a pin axis. An eccentric cap has a radially inner pin engagement surface that is telescopically, slidably mounted on the outer surface and is concentric about the pin axis, a radially outer alignment surface that is eccentric about the pin axis and slides into an alignment hole in the second structural component to align the second structural component relative to the first structural component. A first rotation resistance feature is located on at least one of the outer surface of the locating pin and the pin engagement surface of the eccentric cap, the rotation resistance feature engaging between the outer surface and the pin engagement surface to resist torque applied to the eccentric cap to rotate the eccentric cap relative to the locating pin.

An advantage of an embodiment is that one or more tuning pin assemblies mounted on a structure allows for simple and quick manual fine-tuning of the locating of a second piece of structure relative to the first before final securing together of the two parts. This adjustment can be accomplished with simple, common hand tools by an assembly line worker. Also, the adjustment allows for precision in achieving the desired location of one piece of structure relative to the other.

BRIEF DESCRIPTION OF DRAWINGS

FIG. 1 is a schematic, perspective view of a structural component having a locating pin mounted thereto.

FIG. 3 is a schematic, elevation view of the eccentric tuning pin assembly mounted on the structural component.

DETAILED DESCRIPTION

Figure 2:
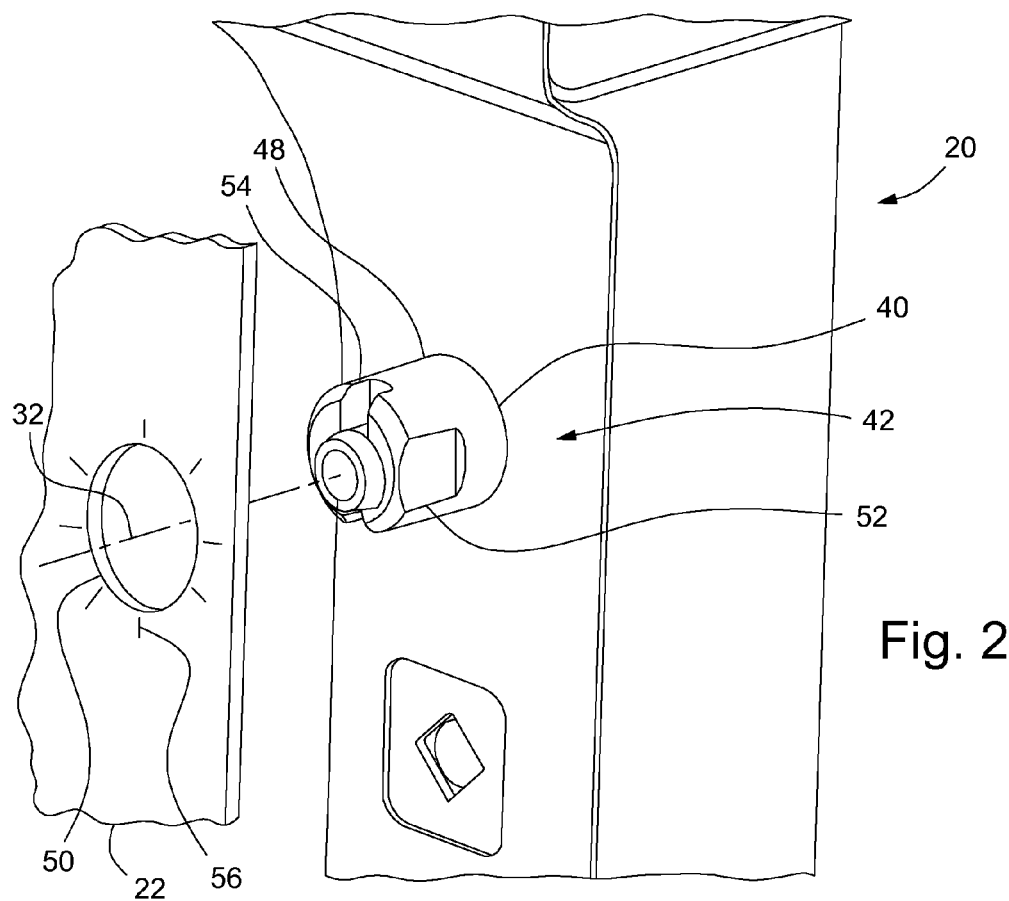
FIG. 2 is a view similar to FIG. 1, but is a partially exploded view showing a rotating eccentric cap mounted on the locating pin and a mating structural component.
Figure 4:
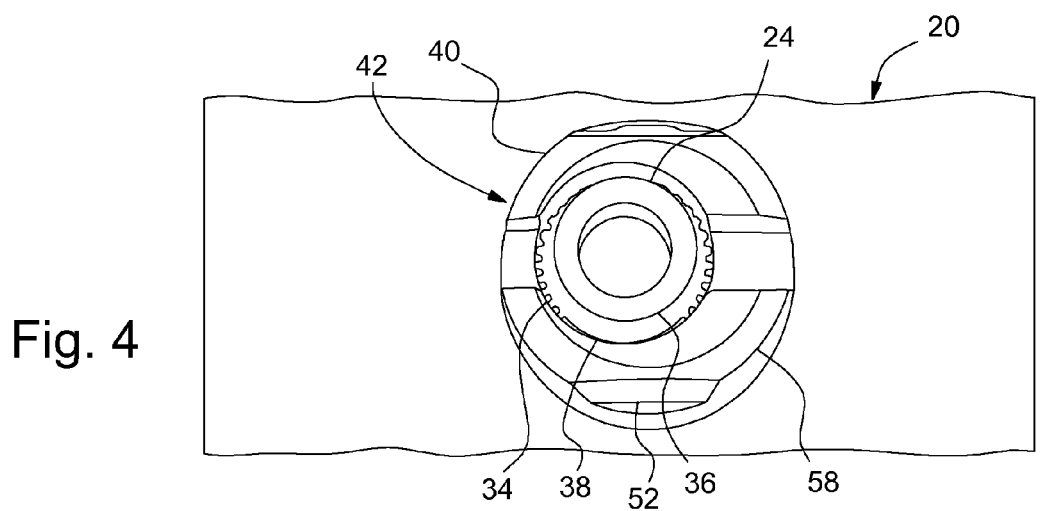
FIG. 4 is a view similar to FIG. 3, but with the rotating eccentric cap rotated ninety degrees clockwise.
Figure 5:
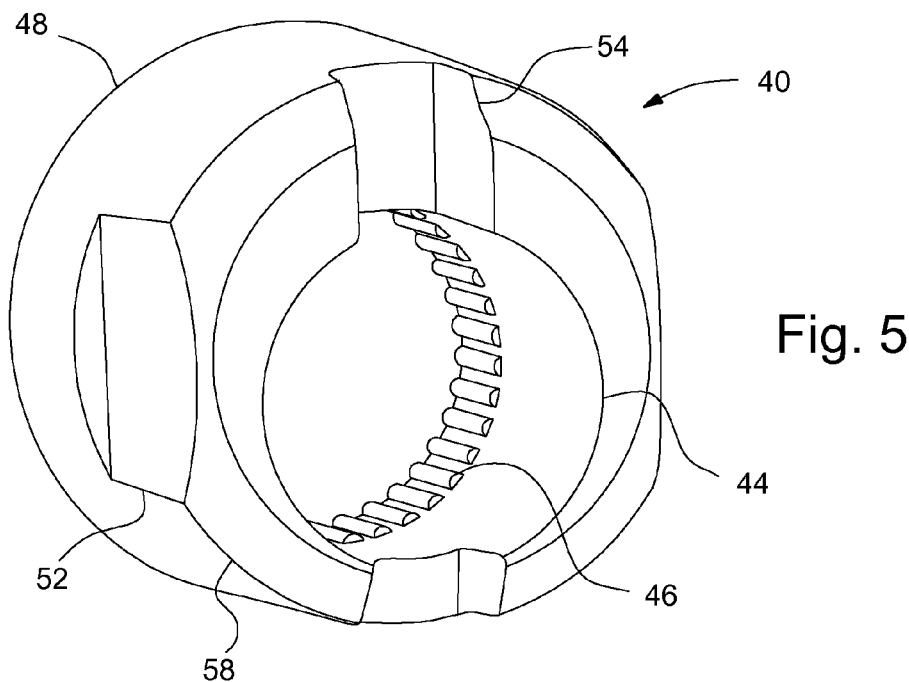
FIG. 5 is a schematic, perspective view of the eccentric end cap.

Referring to FIGS. 1-5, a structural component, indicated generally at 20, and a mating structural component 22, are shown. The components 20, 22, may be for example, portions of a vehicle structure, such as a fender flange and vehicle front end structure, which need to be located precisely relative to each other before permanently securing them together. The permanent securement may be, for example, welding the two parts together. It may be desirable to locate the two components 20, 22 to assure that gap and flushness requirements for the components surfaces are met.

The component 20 has at least one locating pin 24 mounted to and extending therefrom. In general, the component 20 may have more than one locating pin, but the drawings show one pin for clarity in showing the features of the various parts of the assembly. The pin 24 is rotationally fixed relative to the component 20. The locating pin 24 includes a shaft 26 secured to the component 20, which may be via a base 28. An outer surface 30 of the shaft 26 is centered about (i.e., concentric with) a pin axis 32. The pin 24 may also include a rotation resistance feature 34 on the outer surface 30. The rotation resistance feature 34 may be, for example, knurls on the outer surface 30 near the base 28. An end 36 of the pin 24 opposite from the base 28 may include a chamfer 38 for ease in sliding other parts onto the pin 24—for example, a rotating eccentric cap 40.

The rotating eccentric cap 40 mounts on the locating pin 24 to create an eccentric tuning pin assembly 42. The cap 40 includes an inward facing pin engagement surface 44 that engages with the outer surface 30 of the locating pin 24 and is concentric with the pin axis 32. A rotation resistance feature 46 may extend from the pin engagement surface 44 and is located to engage with the rotation resistance feature 34 of the pin 24. This feature 46 may be, for example, longitudinally extending, radially inward facing lobes that mate with knurls on the pin 24. The term rotation resistance feature means some type of feature, such as an extension or recess, that tends to cause resistance to rotation of the cap 40 relative to the pin 24, but can be overcome with the application torque applied to the cap 40. This torque, for example, may be applied by some type of typical hand or power tool (e.g., a wrench, screwdriver, etc.) that can overcome the resistance in order to rotate the cap 40 to the desired location. After rotation, when the tool is removed, the cap 40 will then remain in this position relative to the pin 24 due to the engagement of the rotation resistance features 34, 46.

The rotation eccentric cap 40 may also include an alignment surface 48 that is formed on the radially outer surface of the cap 40 and is eccentric about the pin axis 32. The mating structural component 22 includes an alignment hole 50 that is located and sized to receive the alignment surface 48 therein. The hole 50 may be circular, oval or elliptical in shape, as desired. The eccentricity of the alignment surface 48, then, allows for the adjustment of the structural component 20 relative to the mating structural component 22 by changing the rotational position of the cap 40 on the locating pin 24. The cap 40 may also include a tool engagement feature 52. The term tool engagement feature means some type of feature on the cap 40 that is configured for engagement with a typical tool (wrench, screwdriver, or other type of typical tool) to provide torque for rotating the cap 40 relative to the pin 24 against the resistance of the rotation resistance features 34, 46.

The rotating eccentric cap 40 may also include an alignment visual aid 54, such as, for example, a slot, on or recessed in the surface of the cap 40 to allow one to easily see the rotational position of the cap 40 on the pin 24. In Addition, the mating structural component 22 may include a dial face (gauge) 56 that can also assist an assembly worker with visually determining the rotational position of the cap 40. And again, a chamfer 58 may be included in order to assist in sliding the mating structural component 22 onto the cap 40 when mounting the mating structural component 22 to the structural component 20.

With one or more of the eccentric tuning pin assemblies 42 mounted to the structural component 20, the mating structural component 22 can be aligned properly with the structural component 20. When first mounted, the assembly line worker can determine if the alignment between the two components 20, 22 is correct. If not, then the worker can use a tool to grip the rotating eccentric cap(s) 40 and rotate as needed to obtain the desired alignment (set location) of the components 20, 22. Once aligned properly, the components 20, 22 may undergo a securing process, such as, for example, welding, to assure the two components 20, 22 are permanently secured in the proper alignment.

If so desired, the rotating eccentric cap 40 may be made of a material that can be molded over the locating pin 24 in order to ensure a tight fit between the two. Also, the amount of eccentricity in the cap can vary from application to application depending upon various factors, such as, for example, packaging space, minimum pin diameter and desired amount of potential adjustment.

Figure 6:
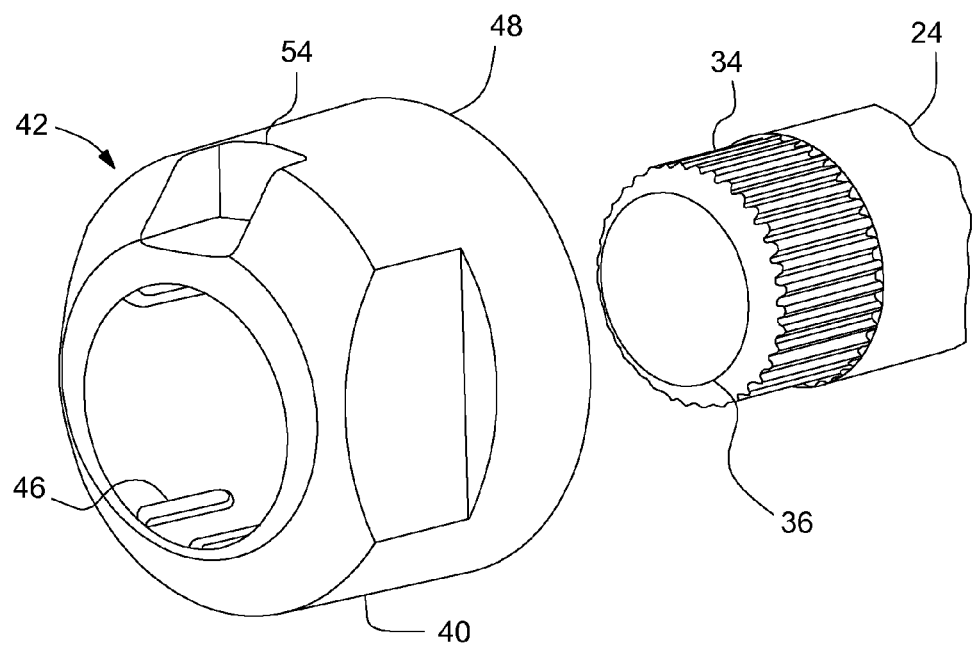
FIG. 6 is a schematic, exploded, perspective view of another embodiment of the eccentric tuning pin assembly.

FIG. 6 illustrates another configuration for the eccentric tuning pin assembly 42. In this case, the rotation resistance feature 34 is now located near the end 36 of the locating pin 24 opposite the base, with the rotation resistance feature 46 of the rotating eccentric cap 40 located to engage with the other rotation resistance feature 34. Also, the alignment visual aid 54 is now configured as a notch rather than a slot, but can still perform the same function of allowing for an assembly worker to easily see the rotational position of the cap 40. As in the first embodiment, the alignment surface 48 is still eccentric to the pin 24, allowing for the adjustment of the components as they are being assembled.

As another alternative, the cap may be a removable cap mounted on the locating pin. If the location of the structural component and mating structural component is fine, the cap stays on, but if adjustment is needed, then the cap is removed by the person assembling the components, in effect allowing the pin to be moved around in a now oversized hole to allow for adjustment. The removable cap may have an eccentric or a concentric alignment surface. If eccentric, then it the alignment may proceed as discussed above, but with the additional potential of the step of removing the cap if the rotation of the eccentric cap is not sufficient to obtain the desired alignment. For a cap having a concentric alignment surface. The assembly process includes mounting the mating structural component on the one or more tuning pin assemblies and determining if the alignment is sufficient—if not, then the cap is removed and the adjustment between the structural components is made by adjusting the locating pins in what is now an oversized alignment hole. And, as mentioned above, with either the eccentric cap or the concentric cap, the cap can be molded onto the locating pin, if so desired.

While certain embodiments of the present invention have been described in detail, those familiar with the art to which this invention relates will recognize various alternative designs and embodiments for practicing the invention as defined by the following claims.

What is claimed is:

1. An eccentric tuning pin assembly for mounting a first structural component to a second structural component comprising:
   a locating pin configured to be fixed to the first structural component and having a shaft with an outer surface that is concentric about a pin axis;
   an eccentric cap having a radially inner pin engagement surface that is telescopically slidably mounted on the outer surface and is concentric about the pin axis, a radially outer alignment surface that is eccentric extending around the pin axis and is configured to slide into an alignment hole in the second structural component to thereby allow for variation in alignment of the second structural component relative to the first structural component normal to the pin axis; and
   a first rotation resistance feature on at least one of the outer surface of the locating pin and the pin engagement surface of the eccentric cap, the rotation resistance feature engaging between the outer surface and the pin engagement surface to resist torque applied to the eccentric cap to rotate the eccentric cap relative to the locating pin.

2. The assembly of claim 1 wherein the eccentric cap includes a tool engagement feature configured to accept a tool to induce a torque to overcome the first rotation resistance feature.

3. The assembly of claim 2 wherein the tool engagement feature is an opposed pair of flat surfaces configured to receive a wrench for causing rotation of the eccentric cap relative to the locating pin.

4. The assembly of claim 1 wherein the eccentric cap includes an alignment visual aid on an outer surface configured to indicated a rotational position of the eccentric cap relative to the locating pin.

5. The assembly of claim 4 wherein the alignment visual aid is a slot extending through a portion of the eccentric cap.

6. The assembly of claim 4 wherein the alignment visual aid is a notch recessed into the eccentric cap.

7. The assembly of claim 1 wherein the first rotation resistance feature is knurls on a portion of the outer surface of the locating pin.

8. The assembly of claim 7 wherein the eccentric cap includes a second rotation resistance feature mating with the knurls.

9. The assembly of claim 8 wherein the second rotation resistance feature is a series of longitudinal lobes extending radially inwardly from the inner pin engagement surface that press against the knurls.

10. The assembly of claim 1 wherein the first rotation resistance feature is a series of longitudinal lobes extending radially inwardly from the inner pin engagement surface that press against the outer surface of the locating pin.

11. An assembly comprising:
    a first structural component;
    a second structural component configured for mating with the first structural component to thereby align the first and second structural components, the second structural component having an alignment hole; and
    an eccentric tuning pin assembly including:
    a locating pin fixed to and extending from the first structural component and having a shaft with an outer surface that is concentric about a pin axis;
    an eccentric cap having a radially inner pin engagement surface that is telescopically slidably mounted on the outer surface and is concentric about the pin axis, a radially outer alignment surface that is eccentric extending around the pin axis and is slidably received in the alignment hole in the second structural component to thereby allow for variation in alignment of the second structural component relative to the first structural component and an alignment visual aid on an outer surface configured to indicated a rotational position of the eccentric cap relative to the locating pin; and a first rotation resistance feature on at least one of the outer surface of the locating pin and the pin engagement surface of the eccentric cap, the rotation resistance feature engaging between the outer surface and the pin engagement surface to resist torque applied to the eccentric cap to rotate the eccentric cap relative to the locating pin.

12. The assembly of claim 11 wherein the eccentric cap includes a tool engagement feature configured to accept a tool to induce a torque to overcome the first rotation resistance feature.

13. The assembly of claim 12 wherein the tool engagement feature is an opposed pair of flat surfaces configured to receive a wrench for causing rotation of the eccentric cap relative to the locating pin.

14. The assembly of claim 11 wherein the second structural component includes a dial face adjacent to the alignment hole to thereby provide a visual indication of the rotational position of the eccentric cap relative to the locating pin.

15. The assembly of claim 11 wherein the first rotation resistance feature is knurls on a portion of the outer surface of the locating pin.

16. The assembly of claim 15 wherein the eccentric cap includes a second rotation resistance feature mating with the knurls.

17. The assembly of claim 16 wherein the second rotation resistance feature is a series of longitudinal lobes extending radially inwardly from the inner pin engagement surface that press against the knurls.

18. The assembly of claim 11 wherein the first rotation resistance feature is a series of longitudinal lobes extending radially inwardly from the inner pin engagement surface that press against the outer surface of the locating pin.

* * * * *